(12) United States Patent
Fong et al.

(10) Patent No.: US 7,251,749 B1
(45) Date of Patent: Jul. 31, 2007

(54) EFFICIENT TRUE IMAGE RECOVERY OF DATA FROM FULL, DIFFERENTIAL, AND INCREMENTAL BACKUPS

(75) Inventors: Yinfung Fong, Campbell, CA (US); Stephen Manley, Pleasanton, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 590 days.

(21) Appl. No.: 10/778,518

(22) Filed: Feb. 12, 2004

(51) Int. Cl.
*G06F 11/00* (2006.01)
(52) U.S. Cl. .............................. 714/20; 714/15; 714/21
(58) Field of Classification Search ................... 714/6, 714/15, 20, 21
See application file for complete search history.

(56) References Cited

U.S. PATENT DOCUMENTS

| | | | |
|---|---|---|---|
| 6,691,245 B1 * | 2/2004 | DeKoning | 714/6 |
| 6,981,177 B2 * | 12/2005 | Beattie | 714/20 |
| 7,069,401 B1 * | 6/2006 | Noonan et al. | 711/162 |
| 7,152,183 B2 * | 12/2006 | Fujibayashi | 714/6 |
| 2004/0030852 A1 * | 2/2004 | Coombs et al. | 711/162 |
| 2004/0163009 A1 * | 8/2004 | Goldstein et al. | 714/6 |

\* cited by examiner

*Primary Examiner*—Scott Baderman
*Assistant Examiner*—Tim Bonura
(74) *Attorney, Agent, or Firm*—Blakely Sokoloff Taylor & Zafman LLP

(57) ABSTRACT

A method and apparatus to recover a set of data from a full backup and an incremental or differential backup are described. This includes a source directory that was modified between the full backup and the incremental or differential backup. The full backup is restored, including the source directory, and a new directory is created to replace the restored directory when the incremental or differential backup is applied to the restored full backup. Content for an entry from the modified source directory in the incremental or differential backup is created in the new directory if the corresponding content is present in the incremental or differential backup. If the content for the entry is not present in the incremental or differential backup, then the entry in the new directory is linked to corresponding content in the restored directory from the full backup.

18 Claims, 10 Drawing Sheets

EFFICIENT TRUE IMAGE RECOVERY OF DATA FROM FULL, DIFFERENTIAL, AND INCREMENTAL BACKUPS

FIELD OF THE INVENTION

At least one embodiment of the present invention pertains to data storage systems, and more particularly, to a technique for recovering data from full and incremental backups.

BACKGROUND

Practical file systems used for mission critical computing need protection against catastrophic failures, such as system crashes and data loss. Such systems also need protection from unintended corruption of data and user/application errors. A common practice to protect data from permanent loss is to make backup copies of the data periodically. For example, users may copy the data to another file system where the data can be accessed online (typically in a read-only manner) or to backup storage devices such as tapes, where the data stays offline until mounted again. These two approaches do not necessarily exclude each other.

A simple approach to making backups of a file system is to copy the entire contents of the file system to tapes (or other non-volatile mass storage devices) every time a backup is performed. To recover the file system to its state at the time of a particular backup, the entire particular backup is simply restored back to the target file system. However, due to a characteristic typical of most file systems, this approach is not the most desirable. A typical file system does not change rapidly over time. Between two consecutive backups, only a very small percentage (e.g., 5%) of the data may have changed. Most of the data is identical between any two consecutive backups.

The aforementioned characteristic raises two problems. First, on a second backup, a significant amount of tape space tends to be allocated to data that already exists in the first backup. This decreases the efficiency of tape space and raises costs. Second, a significant amount of time tends to be spent saving the same data again in the second backup.

Based on these considerations, the concept of an incremental backup has been introduced. An incremental backup is based on and follows a full backup. After a full backup, the subsequent incremental backup will capture an image of only the data that has changed since the full backup. This process can continue indefinitely, wherein there are an unlimited number of subsequent incremental backups, each based on the previous incremental backup. On recovery, the full backup is first restored. Then the changes represented by the first incremental backup are distributed to the appropriate locations on the file system to bring the file system up to the state at the time the incremental backup was done. This process is iterated for each of the incremental backups.

Note that a similar process can be run with differential backups. Differential backups work similarly to incremental backups, except that differential backups are not always based on the most recent incremental backup. To minimize the number of backups to restore, differential backups may be based on an older incremental, differential or full backup, thus eliminating the need to retain the incremental and differential backups taken between the base backup and the new differential. The cost of this approach is that the differential backup, by aggregating multiple incremental backups into one backup, is additional system load and consumption of backup storage.

One problem with existing recovery algorithms based on full and incremental backups is that they tend to be very slow. It is desirable to have a data recovery algorithm that will efficiently apply an incremental backup to a restored full backup, to transform a file system to its state at the point of the incremental backup. This is known as a true image recovery, in which the recovered data exactly matches the state of the data at the time of backup. This contrasts with extraction recoveries, in which data is recovered from incremental or differential backups without renaming or removing the files that were renamed or removed between the full and incremental backup.

Some file systems are tree-structured. An example of such a file system is the Write Anywhere File Layout (WAFL) file system used in Filer products made by Network Appliance, Inc. of Sunnyvale, Calif. A file system is commonly made up of directories and individual files. The files usually contain the valuable data, while the directories provide a hierarchy/organization of the files. Every directory contains zero or more "entries", which can be files or sub-directories. There is commonly a root directory, under which there can be multiple sub-directories. Each sub-directory can hold its own sub-directories, and so on. This forms a tree structure organization in which files are distributed among the directories in their defined relationship. On backup and restore, not only is it desirable to recover the data in files, it is also desirable to recover the exact organization of data/files.

In some file servers, a full backup gathers all files and directories and their content from the file system and writes them out to tapes. The incremental backup that follows will only write out files and directories that are new or have been modified since the full backup. The modifications to a directory include addition, removal and renaming of files and sub-directories, as well as content update of an existing file in the directory.

In a typical tree-structured file system such as described above, for every modified directory there is a path that leads to the root directory. Therefore, to generate the full pathname on a recovery, during incremental backup all directories along that path also need to be written out to tapes. These directories might not have been modified; they are in the incremental backup only because one or more of their descendants has been modified. As a result, time is unnecessarily spent processing unmodified directories when the incremental backup is applied to the full backup during recovery.

Another problem with at least one known data recovery algorithm is that in the process of determining which entries to add, delete and keep, every entry in the new directory is compared to every entry in the old directory. The algorithm, therefore, has an order of m×n comparisons between entries in the old directory and entries in the new directory, where m is the number of entries in the old directory and n is the number of entries in the new directory. As a directory grows, the amount of time needed to process the directory during recovery increases exponentially. The algorithm, therefore, does not scale with the directory size.

What is needed, therefore, is a data recovery algorithm, based on full and incremental backups, which overcomes these and other disadvantages of the prior art.

SUMMARY OF THE INVENTION

The present invention includes a method and apparatus to recover a set of data from a full backup and an incremental backup. In certain embodiments, the method is as follows: A first directory is restored based on the full backup. A new, empty second directory is then created, and a determination is then made of whether content corresponding to an entry is present in the incremental backup. The entry is created in the second directory. If content corresponding to the entry is present in the incremental backup, then content for the entry is created in the second directory from the incremental backup. If, however, content corresponding to the entry is not present in the incremental backup, then the entry is linked to corresponding content in the first directory.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
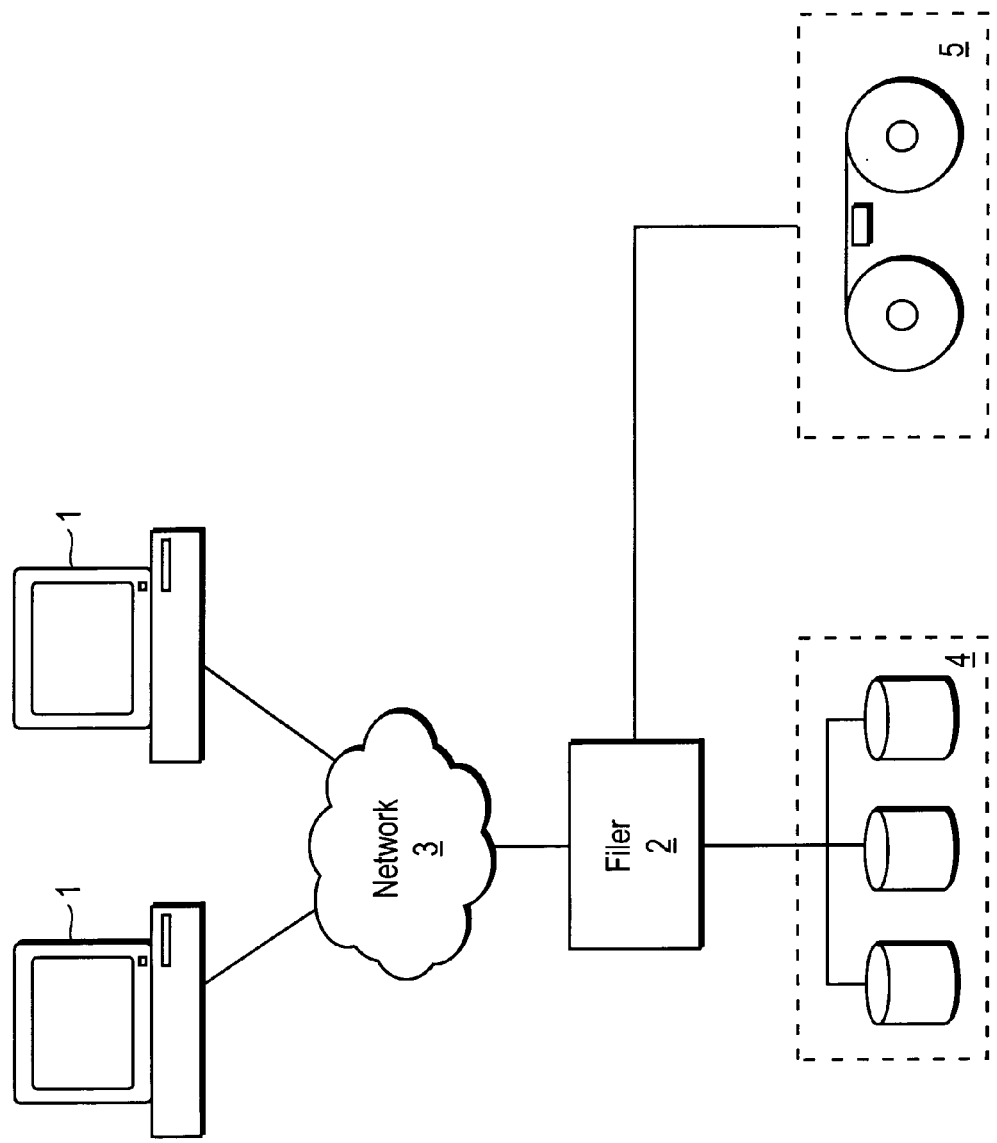
FIG. 1 illustrates a storage network configuration in which the invention can be implemented.

A method and apparatus to recover a set of data from a full backup and an incremental or differential backup in which the data is an exact image of the system at the time of the incremental or differential backup are described. Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment; however, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

There are two observations on backup format that help to solve the problems mentioned above. First, there is normally a last-modified timestamp on every directory in any backup. The timestamp is updated every time a directory is modified directly. For a directory that exists in both the full backup and an incremental backup, to determine if it has been modified since full backup, we can simply compare the timestamps. (To that end, it is important to ensure that the timestamp of a directory is updated only in response to user modifications to the contents of the directory, not in response to simply moving a directory or purely internal file system operations.) If the timestamps are different, the directory has been modified. If the timestamps are identical, the directory has not been modified. Thus, unmodified directories can be skipped in the process of applying the incremental backup during recovery.

Second, for a directory with a modified set of entries in an incremental backup, we update the restored directory in the file system with a new set of entries. At the end of the process, the restored directory should be exactly the same as the one in the incremental backup. It is not necessary to transform the old directory to reflect the new set of entries. We can simply construct the new directory from the content in the incremental backup, and replace the old directory with the new directory.

There are two types of entries in a modified directory in an incremental backup:

1. Entries that have changed since the full backup. Since these entries had changed, the incremental backup picked up the entries as well as their content. During recovery, we can recreate the entries out of the incremental backup alone. In this description, we call these entries "on-tape" entries.

2. Entries that have not changed since the full backup. Since these entries are unchanged, the copy of the content we have restored from the full backup is still valid. We simply have to pull the copy from the old directory into the new directory. In this description, we call these entries "off-tape" entries.

Despite the use of the terms "on tape" and "off tape" in this description, it is to be understood that types of storage media other than tape can be used to store the full and incremental backups in connection with the data recovery technique introduced herein.

Thus, as described further below, the data recovery technique introduced herein is as follows, according to at least one embodiment of the invention. To facilitate description, the technique will be described with respect to incremental backups. Note, however, that the technique is also applicable to differential backups in essentially the same manner as incremental backups and should be understood to apply also to differential backups wherever incremental backups are discussed.

First, the full backup is restored. Next, the following process is repeated for each directory in the set of data that was modified between the full backup and a subsequent backup, e.g., an incremental backup: The directory from the restored full backup (the "old directory") is relocated to temporary storage, and a new empty directory is created in its place. For each entry in the entry list of the directory in the incremental backup, a corresponding entry and content are created in the new directory from the incremental backup if the content is present in the incremental backup (i.e., the content is "on tape"). If, however, content for the entry is not present in the incremental backup (i.e., the content is "off tape"), then the entry is created in the new directory and linked to corresponding content in the restored old directory (from the restored full backup). All of the entries in the directory from the incremental backup are processed in this way, and the process is then repeated for all directories in the incremental backup. After all of the directories in the incremental backup have been processed in this way, all of the directories from the restored full backup are deleted, along with any of their contents which are not linked to an entry in another directory.

If the old directory (the directory restored from the full backup) has entries or content that was removed between backups, no action is taken on those entries. At the conclusion of processing, the original directory contains only old or eliminated data. Thus, without complex calculation, the original directory can be removed, which automatically and completely cleans up the state of the restored system without complicated comparisons and lookups of directory entries.

In contrast with the existing data recovery algorithms discussed above, to restore a modified directory this technique requires no more than n lookups of directory entries between the directory in the incremental backup and the old directory in the full backup, even when m and n are both greater than one (where m and n represent the number of entries in the old and modified directory, respectively). The technique introduced herein, therefore, is much more scalable than the prior technique. In addition, the technique introduced herein, with fewer lookups and computations, tends to be more reliable than prior restoration techniques.

FIG. 1 illustrates an example of a network configuration in which the data recovery technique introduced herein may be employed. Of course, the technique can also be employed in various other types of environments. The illustrated system includes a filer (file server) 2, which may implement the data recovery technique. A number of client processing systems ("clients") 1 are coupled to the filer 2 through a first network 3, such as a LAN. Each of the clients 1 may be, for example, a conventional personal computer (PC), workstation, or the like. The filer 2 provides the clients 1 with access to files stored on a first set of mass storage devices 4, such as magnetic or optical disks, which may be configured as one or more RAID groups.

The filer 2 is also coupled to a backup storage facility 5, which may include one or more tapes. The filer 2 is programmed to save backup copies of its file system to backup storage facility 5 in the form of a full backup and, subsequently, one or more incremental backups. The full backup and the incremental backup(s) may or may not be stored on the same physical storage media.

In certain embodiments, the filer 2 may also be connected (e.g., through a network) to another, remote filer (not shown), such that the two filers cooperate to perform data mirroring. To facilitate explanation, this description is presented in terms of recovering data onto the same filer which created the backups, i.e., where the source is the same as the destination. However, it is to be understood that essentially the same technique can be applied where the destination is different from the source, such as to use backup data of one filer to recover data for another filer.

Figure 2:
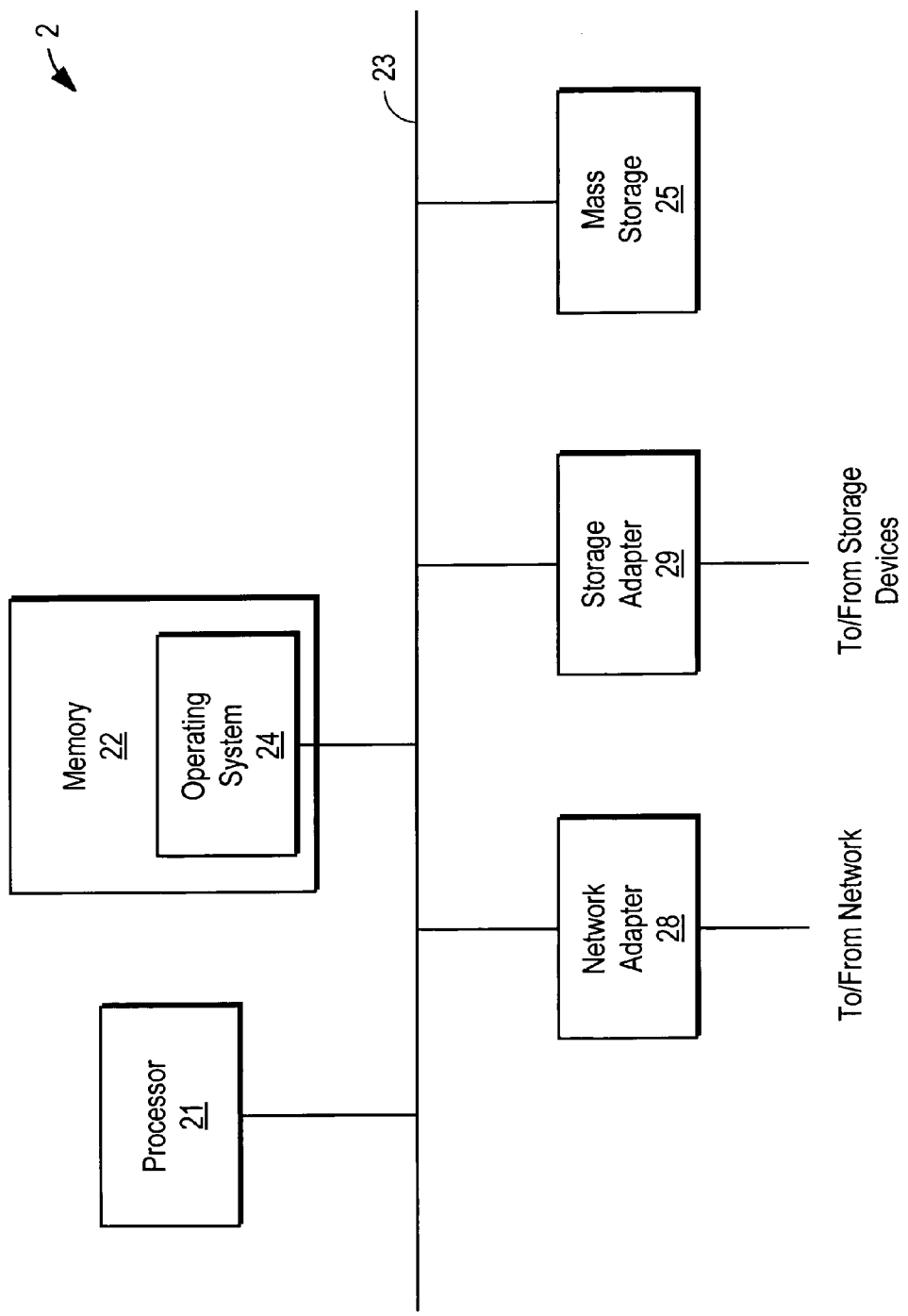
FIG. 2 is a block diagram of the architecture of a filer.

FIG. 2 shows the architecture of the filer 2, according to certain embodiments of the invention. Note that certain standard and well-known components which are not germane to the present invention are not shown. The filer 2 includes one or more processors 21 and memory 22, coupled together by a bus system 23. The bus system 23 in FIG. 2 is an abstraction that represents any one or more separate physical buses and/or point-to-point connections, connected by appropriate bridges, adapters and/or controllers. The bus system 23, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor 21 is the central processing unit (CPU) of the filer 2 and, thus, controls the overall operation of the filer 2. In certain embodiments, the processor 21 accomplishes this by executing software stored in main memory 22. The processor 21 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 22 represents some form of random access memory (RAM), read-only memory (ROM), or both. Memory 22 stores the operating system 24 of the filer 2. The data recovery technique introduced herein may be implemented within the operating system 24, as described further below.

Also connected to the processor 21 through the bus system 23 are a network adapter 28, a storage adapter 29, and one or more internal mass storage devices 25 (not to be confused with the mass storage devices 4 or backup mass storage facility). The network adapter 28 provides the filer 2 with the ability to communicate with remote devices, such as clients and/or another filer, over a network and may be, for example, an Ethernet adapter. The storage adapter 29 allows the filer to access the external mass storage devices and may be, for example, a Fibre Channel adapter or SCSI adapter.

Figure 3:
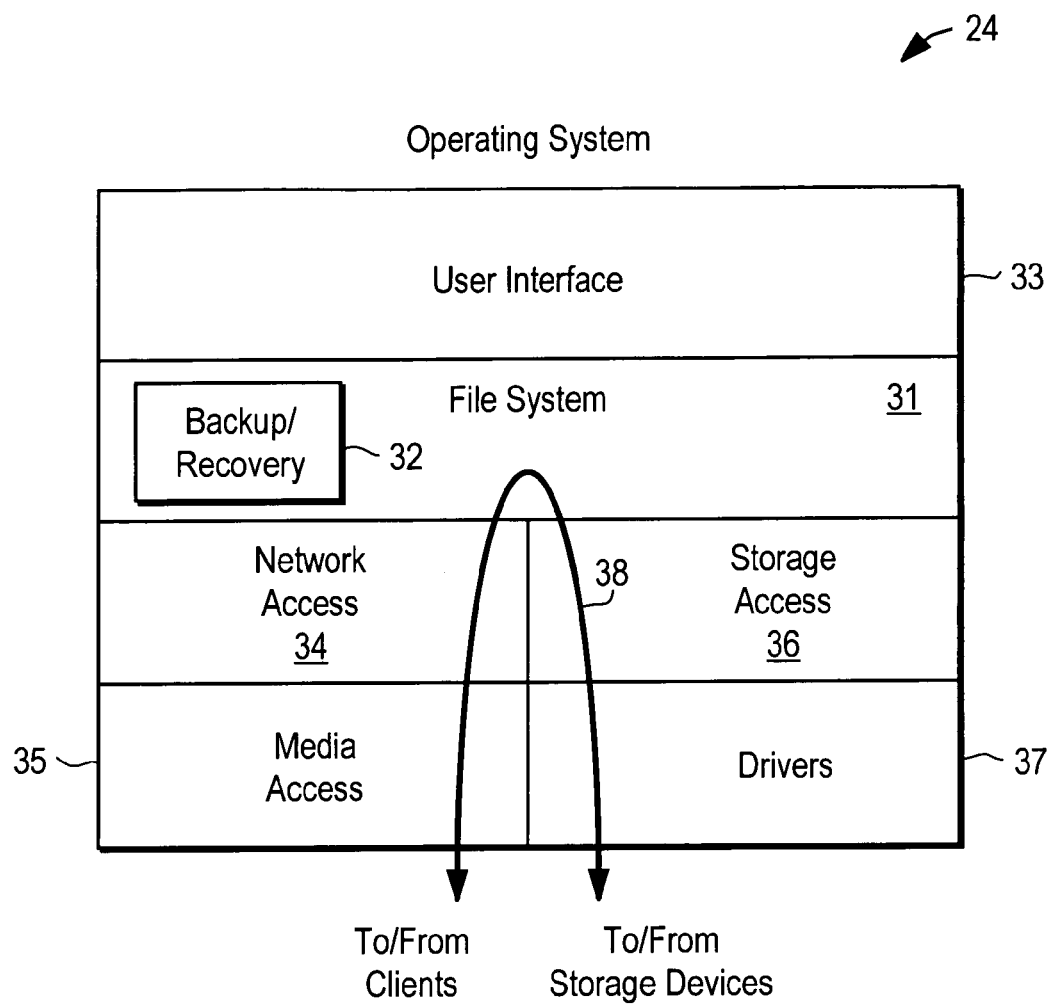
FIG. 3 is a block diagram of the operating system of a filer.

FIG. 3 illustrates the operating system 24 of the filer 2, according to certain embodiments of the invention. As can be seen, the operating system 24 includes a number of layers. The core of the operating system 24 is the file system layer 31 which, among other responsibilities, executes read and write operations on the mass storage devices 4 in response to client requests, maintains directories, etc. The file system layer 31 operates on blocks of data of a predetermined size, such as 4 kbytes. The data backup and recovery techniques described herein may be implemented by a module 32 within the file system layer 31, as shown in FIG. 3. Also shown in FIG. 3 is the logical data path 38 from clients to mass storage devices, through the file system 31.

Above the file system layer 31, the operating system 24 also includes a user interface 33, through which a network administrator or other user can control and/or configure the filer (e.g., remotely from a management station). The user interface 33 may generate a command line interface and/or a graphical user interface for this purpose.

Below the file system layer 31, on the client side the operating system 24 includes a network layer 34 and, at the lowest level, a media access layer 35. The network access layer 34 implements any of various protocols used to communicate with client devices, such as network file system (NFS), common Internet file system (CIFS) and/or hypertext transport protocol (HTTP). The media access layer 35 includes one or more drivers which implemented the protocols used to communicate over the network, such as Ethernet.

Below the file system layer 31 on the storage device side, the operating system 24 includes a storage access layer 36 and, at the lowest level, a driver layer 37. The storage access layer 36 implements a disk storage protocol such as RAID, while the driver layer 37 implements a lower-level storage device access protocol, such as Fibre Channel or SCSI.

Figure 4:
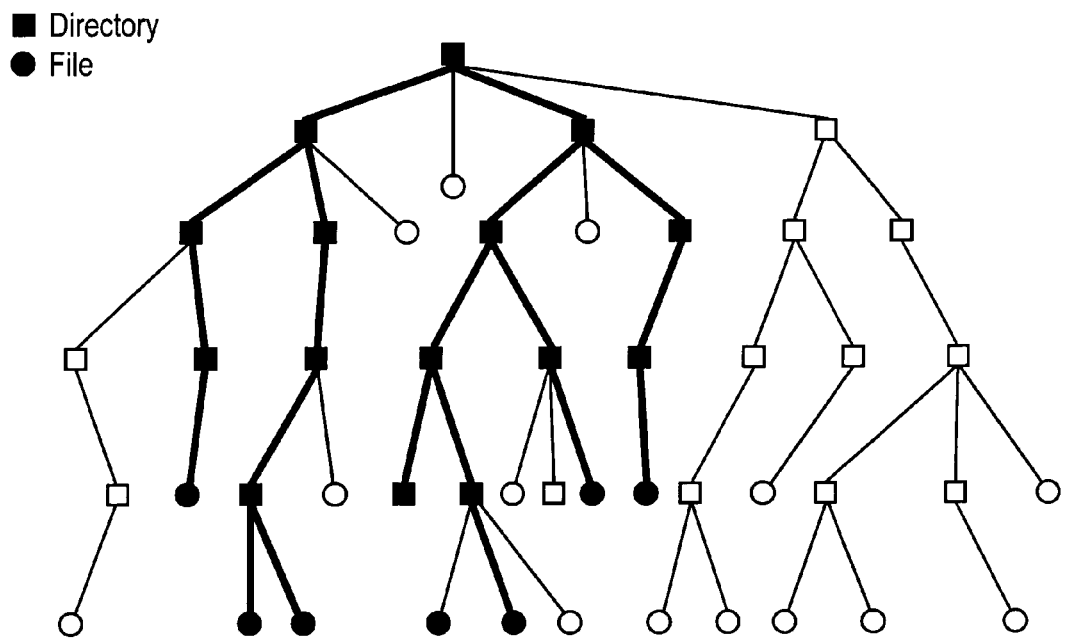
FIG. 4 illustrates an example of a tree-structured file system at the time of an incremental backup.
Figure 5:
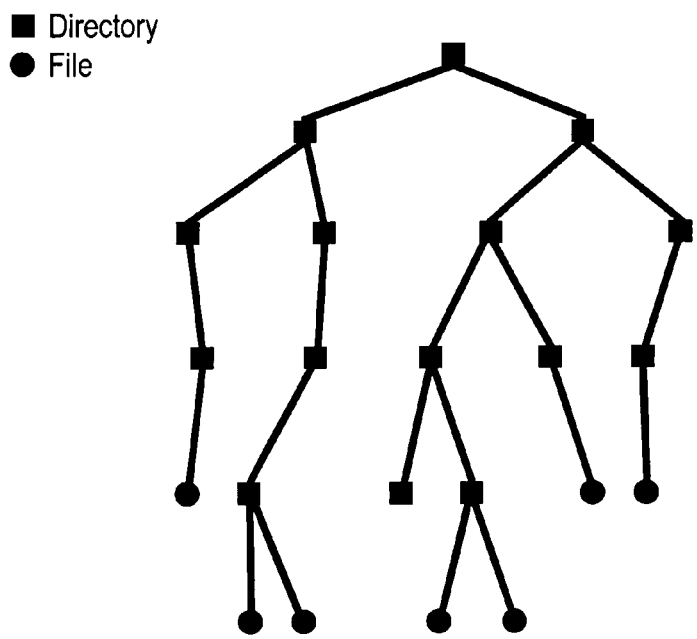
FIG. 5 illustrates an image of a portion of the file system of FIG. 4, as captured by the incremental backup.

FIG. 4 shows an example of an image of a tree-structured file system, such as may be implemented by filer 2, at the time of an incremental backup. The nodes connecting the various branches represent files and directories (directories are shown as rectangles, and files are shown as ovals). The files and directories represented by thicker ("black") lines either have been modified or are ancestors of those which have been modified since the full backup. The branches represented by thinner ("gray") lines are files and directories that have not been modified since the full backup. The incremental backup will capture an image of only the part of the file system shown in the thicker lines. In other words, the incremental backup will contain the image of a partial file system, such as shown in FIG. 5.

With the incremental backup alone, it is possible to reconstruct the exact image, including up-to-date file content, of the partial file system. Note that the only difference between directory structures in FIG. 4 and FIG. 5 is in the gray branches, which remain the same between the full and incremental backups. If the full backup is restored to a separate known place, all those gray branches reside in it and are in the correct (up-to-date) state. By purging all those necessary branches out of the full backup destination and inserting them in the right places, the result is a file system reflecting the image of the source file system at the time of the incremental backup. This purging and re-attaching does not necessarily have to be done after the partial file system from the incremental backup is fully erected. It could as well be done while recreating each directory in the incremental backup.

Figure 6:
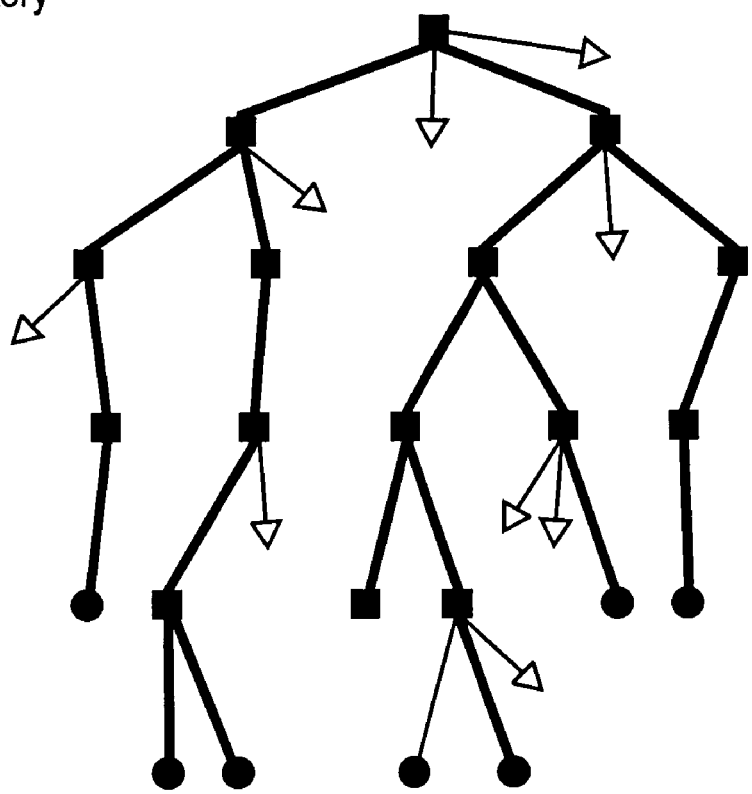
FIG. 6 is another illustration of the partial file system as captured by the incremental backup.

Therefore, two issues should be addressed: 1) when to insert a gray branch from the full backup, and 2) where to locate that branch on the full backup file system tree. Regarding the first issue, FIG. 6 is a more precise representation of the incremental backup of FIG. 5. For every unmodified branch coming out of a directory, there exists in the directory an entry that does not refer to any file/directory content (inode) on the tape. Note that this description assumes a file system that is based on the use of "nodes" such as in the Unix operating system.

In other words, there are two types of directory entries in any directory of an incremental backup:

1. Off-tape entry—a directory entry that refers to an inode not in the incremental backup.
2. On-tape entry—a directory entry that refers to an inode in the incremental backup.

An off-tape entry indicates that there is a file or sub-directory in the current directory that had not been modified since the full backup, such that the incremental backup does not have the content of the file or sub-directory. For off-tape entries, their contents are obtained from the destination of the full backup (the restored full backup).

Regarding the issue of where to locate that branch on the full backup file system tree, note that the fact that a particular file, call it abc, is untouched between the full backup and the incremental backup normally implies not only that its content has not changed, but also that its parent remains the same. The source inode of the file's parent is known. With the parent source inode, the inode map (or translation table) gives the parent destination inode on the full backup destination. The name for abc on the full backup destination is also abc (the name has to remain the same, otherwise, it violates the initial assumption that abc does not change). With a handle to its parent directory and its name in the full backup destination, we can easily move the file into the current directory. If this algorithm runs on a system that does not obey the initial assumption, the algorithm is still functional, though less optimized. The unique name of the file will need to be either stored by the baseline recovery, or the incremental recovery will need to look up the name of the file by its unique descriptor.

Figure 7:
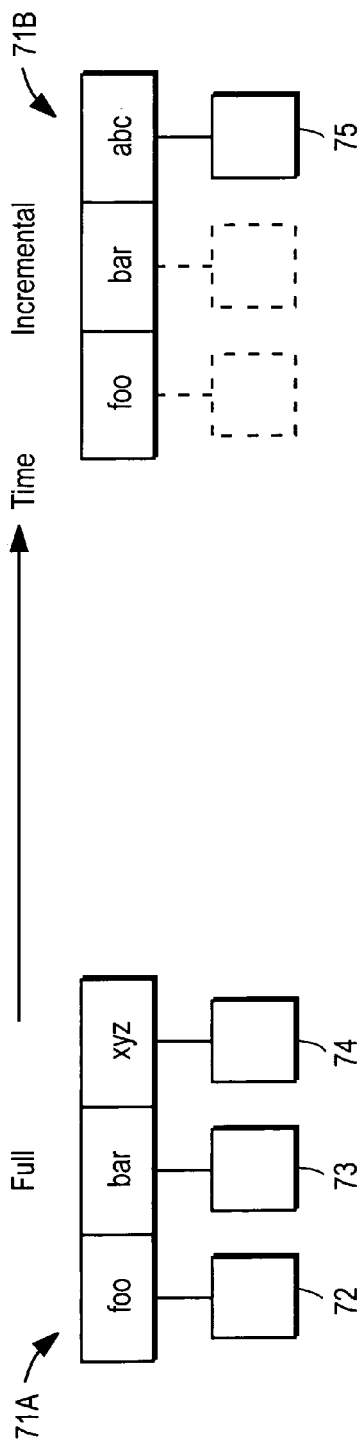
FIG. 7 illustrates a directory in a full backup and the same directory as modified in a subsequent incremental backup.
Figure 8:
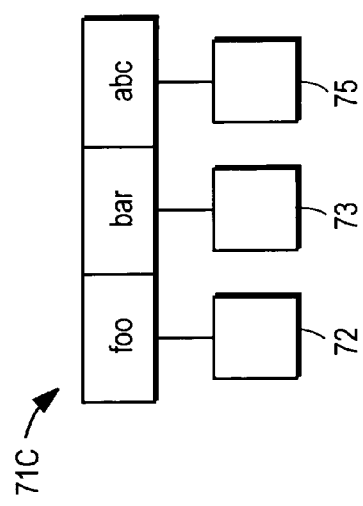
FIG. 8 illustrates the result of applying the incremental backup of FIG. 7 to the full backup of FIG. 7 during a data recovery process.

FIGS. 7 and 8 conceptually show an example of a directory at different points in time during the backup and recovery processes. At the time of the full backup, the directory 71A includes three entries, foo, bar, and xyz, as shown at the left side of FIG. 7. Each entry in a directory 71A is assigned an inode number (not shown), which indicates the location of the content for that entry. Hence, the entries foo, bar and xyz are linked to their corresponding content 72, 73 and 74, respectively, by their inode assignments.

The same directory at the time of the incremental backup appears as 71B at the right side of FIG. 7. At the time of the incremental backup, xyz has been deleted from the directory and a new entry, abc, has been added along with its content 75. The content for foo and bar is not present in the directory 71B in the incremental backup (i.e., it is off tape), as indicated by the dashed lines in FIG. 7, since that content has been neither deleted nor modified since the full backup. FIG. 8 shows the result of merging incremental backup with the full backup during the data recovery process. As shown, the resulting directory 71C includes three entries, foo, bar and abc, which are linked to their corresponding content, 72, 73 and 75, respectively. The resulting directory 71C reflects the fact that xyz has been deleted from the directory and abc has been added.

Figure 9A:
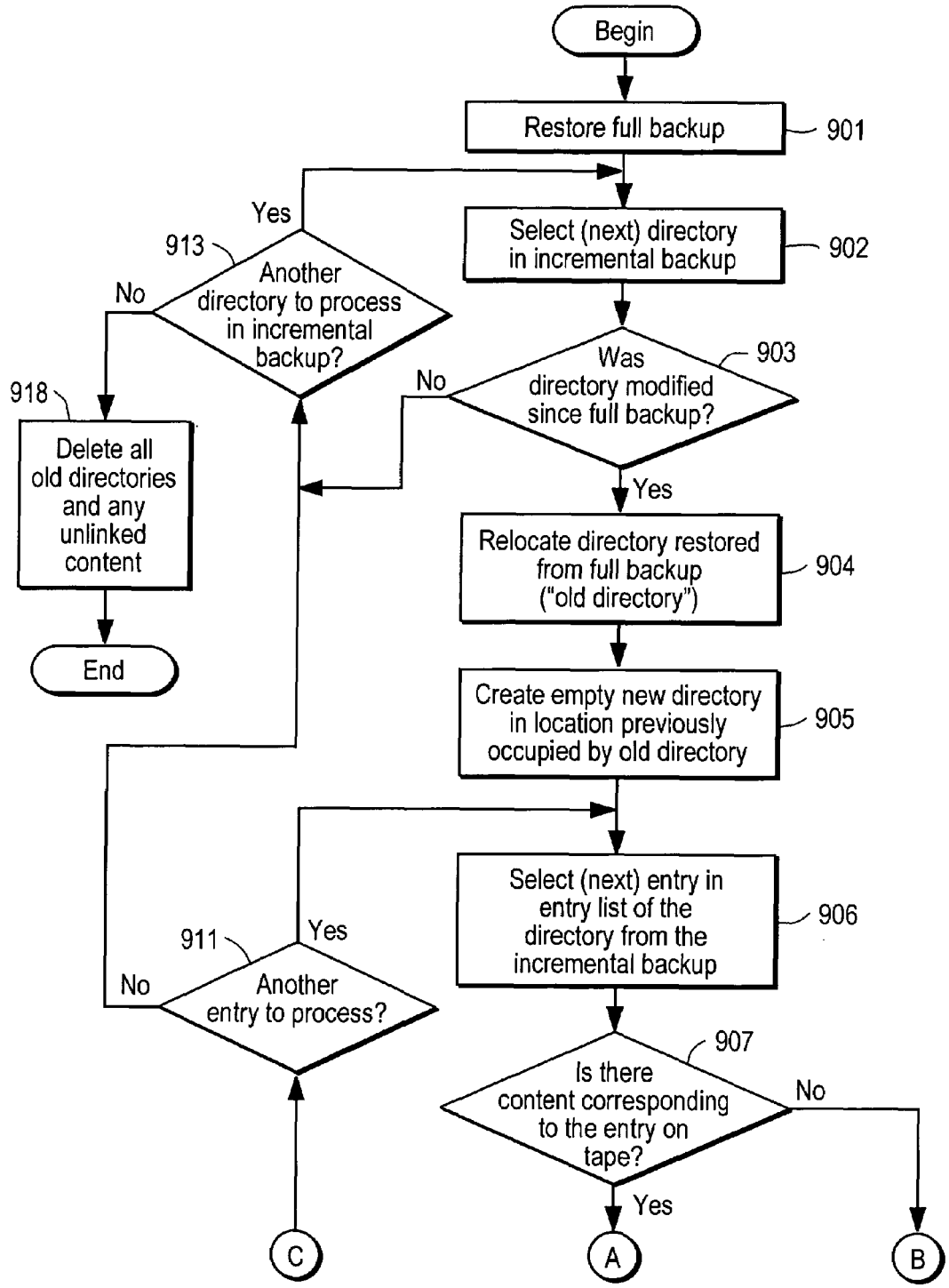
FIG. 9 shows a process of recovering data from a full backup and an incremental backup in accordance with the invention.
Figure 9B:
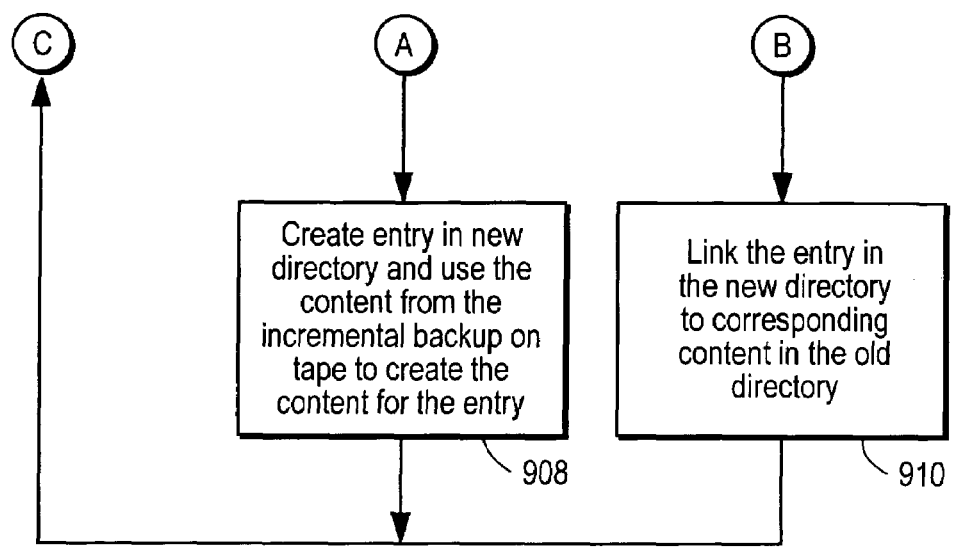
Figure 10A:
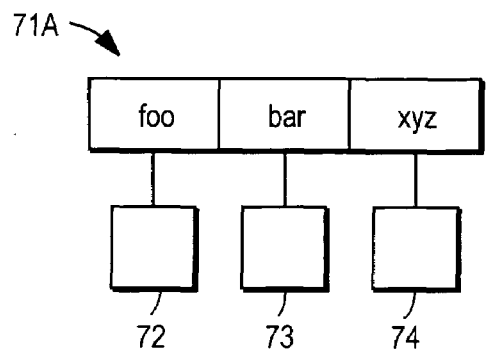
FIG. 10 illustrates the process of FIG. 9 with respect to a particular directory that has been modified since the full backup.
Figure 10B:
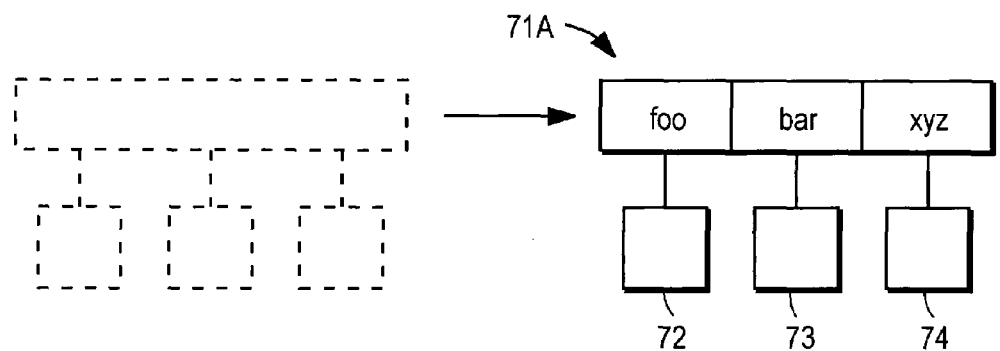
Figure 10C:
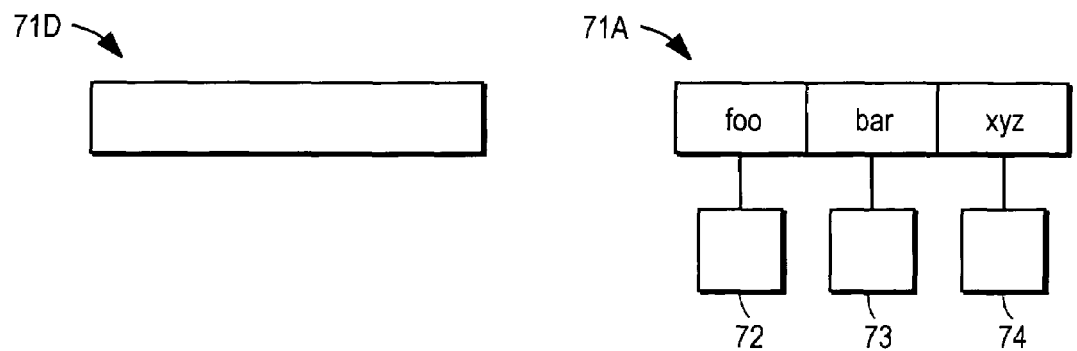
Figure 10D:
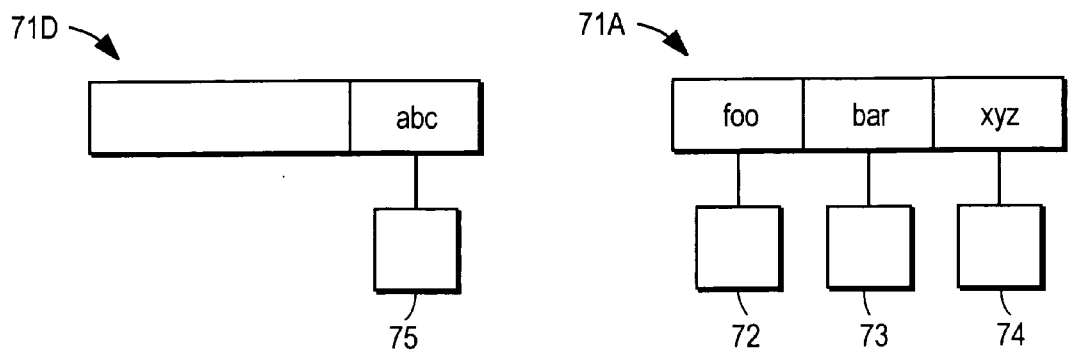
Figure 10E:
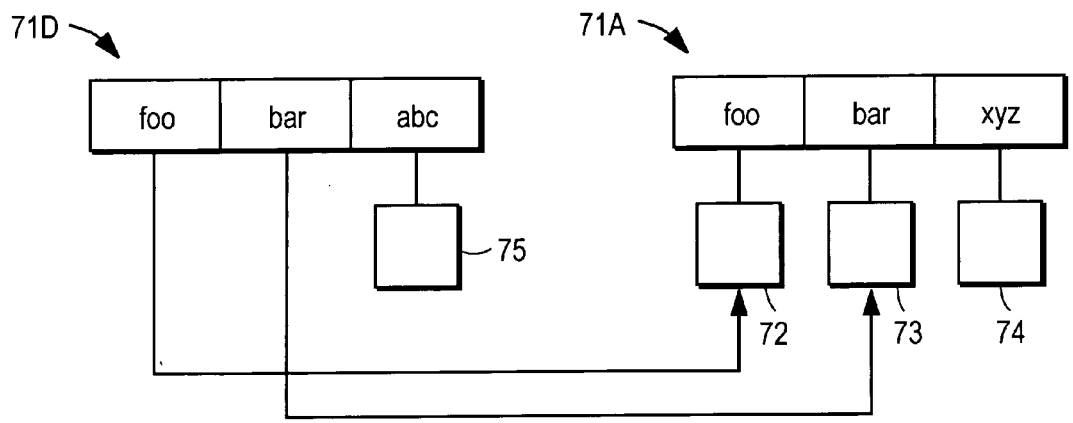
Figure 10F:
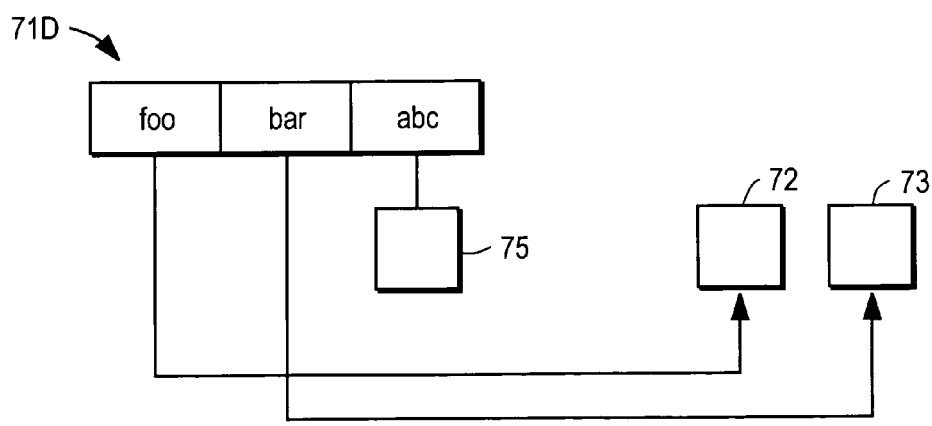

The data recovery process will now be further described with reference to FIGS. 9 and 10. FIG. 9 shows the data recovery process according to certain embodiments of the invention. Initially, the full backup is restored at 901. Reference numerals 902 through 912 in FIG. 9 represent a subprocess performed for each directory in the file system as represented in the incremental backup. In at least one embodiment, the partial file system tree from the incremental backup is traversed directory-by-directory starting from the root directory, using a breadth-first approach. At 902 a directory in the incremental backup is selected, and at 902 it is determined whether the directory was modified since the full backup (e.g., based on its timestamp). A directory is considered to have been modified if it has been directly modified or if it is along the path from a directly modified file or directory to the root. If the directory was not modified, the process proceeds by selecting the next directory in the incremental backup, if any (913 and 902). If all directories have been considered (913), the process ends.

Reference numerals 904 through 910 represent a subprocess that is performed for each directory that was modified since the full backup. If the currently selected directory was modified (as determined at 903), then at 904 the old directory (i.e., the directory as restored from the full backup) is relocated to a temporary location. Then, at 905 a new empty directory is created in the location previously occupied by the old directory, to replace the old directory.

Reference numerals 906 through 910 represent a subprocess that is performed for each entry in the modified directory. Associated with each modified directory in the incremental backup is an entry list (not shown) indicating the entries in that directory. At 906 an entry in the entry list is selected, and at 907 it is determined whether the content for that entry is on tape (in the incremental backup). If the content for that entry is on tape, then at 908 the entry is created in the new directory and the corresponding content from the incremental backup is used to create the content for that entry. On the other hand, if the content for the entry is off tape (not in the incremental backup), then at 910 the entry is created in the new directory and linked to the corresponding content in the old directory (i.e., from the restored full backup).

There is special case of 910 associated with a Unix based system, which should be mentioned at this point. This is the case where the entry being processed is an off tape directory (as opposed to a file). In a Unix based system, a file can be referred to by more than one name, such that there can be more than one link to the content associated with a file. However, a directory can have only one parent. Consequently, at 910 in a system with this limitation, if the entry being processed is a directory, then the entry is actually moved from the old directory to the new directory, rather than linking the entry in the new directory to the content in the old directory.

After all entries in the entry list have been processed (911), the foregoing process is then repeated for each remaining directory in the incremental backup (913). After all directories in the incremental backup have been processed, then at 912 all old directories (i.e., the directories from the restored full backup) are deleted along with any of their contents that are not linked to an entry in another directory.

FIG. 10 uses the example from FIGS. 7 and 8 to illustrate the foregoing process for a particular directory which is modified since the full backup. The old directory 71A resulting from restoring the full backup is shown in FIG. 10A. After restoring the full backup, the directory 71A is moved to a temporary location, as shown in FIG. 10B. Next, a new empty directory 71D is created in the location previously occupied by the old directory, as shown in FIG. 10C. As discussed above, entry abc was created after the full backup and, therefore, is on tape. Consequently, as shown in FIG. 10D, entry abc is created in the new directory 71D along with its content 75 from the incremental backup. On the other hand, entries foo and bar were not modified since the full backup and, therefore, are off tape. Consequently, after creating these entries in the new directory 71D, these entries are linked to the corresponding content from the restored full backup, as shown in FIG. 10E. Note that entry xyz never appears in the new directory 71D, since that entry was deleted before the incremental backup. After all of the directories in the incremental backup have been processed, the old directory 71A is deleted, excluding any of its content which has been linked with an entry in a new directory created by this process.

In contrast with certain known data recovery algorithms, the technique introduced above restores any modified directory using no more than n lookups of directory entries between the directory as represented in the incremental backup and the directory as represented in the full backup (where m and n are the number of entries in the old and modified directory, respectively), even when m and n are both greater than one. The technique introduced above, therefore, is much more scalable than the prior technique. In addition, the technique introduced above tends to be more reliable.

Thus, a method and apparatus to recover a set of data from a full backup and an incremental or differential backup in which the data is an exact image of the system at the time of the incremental or differential backup have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method of recovering a set of data from a full backup and a subsequent backup, the method comprising:
   restoring a first directory based on the full backup;
   creating a new empty second directory;
   determining whether content corresponding to an entry is present in the subsequent backup;
   creating the entry in the second directory;
   if content corresponding to the entry is present in the subsequent backup, then creating content for the entry in the second directory from the subsequent backup; and
   if content corresponding to the entry is not present in the subsequent backup, then linking the entry to corresponding content in the first directory, wherein said linking includes assigning a metadata identifier of the entry.

2. A method as recited in claim 1, further comprising deleting the first directory.

3. A method as recited in claim 2, further comprising deleting content in the first directory if the content in the first directory is not linked to an entry in another directory.

4. A method as recited in claim 1, wherein the first directory and second directory correspond to a directory that was modified after the full backup was created and before the subsequent backup was created.

5. A method as recited in claim 1, wherein the set of data is a file system, and the subsequent backup is an image of at least a portion of the file system.

6. A method as recited in claim 1, wherein the metadata identifier is an inode number.

7. A method of recovering data from a full backup and a subsequent backup, the method comprising:
   restoring the full backup from a backup storage facility, including restoring a directory which was modified after the full backup but before the subsequent backup; and
   creating an empty new directory to replace the restored directory;
   for each entry in a source directory in the subsequent backup corresponding to the restored directory,
      determining if content corresponding to the entry is present in the subsequent backup,
      if content corresponding to the entry is present in the subsequent backup, then creating an entry in the new directory, using the content from the subsequent backup to create the content for the created entry, and
      if content corresponding to the entry is not present in the subsequent backup, then creating an entry in the new directory and linking the entry in the new directory to corresponding content in the restored directory, wherein linking the entry in the new directory includes assigning a metadata identifier of the entry in the new directory.

8. A method as recited in claim 7, wherein the set of data is a file system, and the subsequent backup is an image of at least a portion of the file system.

9. A method as recited in claim 7, further comprising deleting the restored directory.

10. A method as recited in claim 7, wherein the set of data comprises a plurality of directories, the method further comprising repeating said creating, said determining, said using, and said linking, for each of the plurality of directories.

11. A method as recited in claim 7, wherein the metadata identifier is an inode number.

12. A method of recovering a set of data from a full backup and a subsequent backup, the method comprising:

restoring the full backup from a backup storage facility, the full backup including one or more directories, each of the directories including zero or more entries, the subsequent backup also including one or more directories, each of the directories in the subsequent backup including zero or more entries and having an associated entry list identifying the zero or more entries in the directory; and for each directory in the subsequent backup,
determining if the directory was modified since the full backup;
if the directory was not modified since the full backup, then skipping the directory; and
if the directory was modified since the full backup, then
relocating a version of the directory restored from the full backup;
creating an empty new directory in a location previously occupied by the relocated directory, to replace the relocated directory;
for each entry in the entry list,
determining if content corresponding to the entry is present in the subsequent backup,
if content corresponding to the entry is present in the subsequent backup, then using the content from the subsequent backup to create the content in the new directory, and
if content corresponding to the entry is not present in the subsequent backup, then linking the corresponding entry in the new directory to corresponding content in the relocated directory restored from the full backup, by assigning an inode number of the entry in the new directory;
and
deleting the relocated directory.

13. A method as recited in claim 12, wherein the set of data is a file system, and the subsequent backup is an image of at least a portion of the file system.

14. A storage system comprising:
a processor;
a first storage facility comprising one or more mass storage devices storing a full backup of a set of data;
a second storage facility comprising one or more mass storage devices storing a subsequent backup of the set of data;
a memory storing instructions which, when executed by the processor, cause the storage system to perform a process of recovering the set of data from the full backup and the subsequent backup, wherein the process includes
restoring the full backup, including restoring a directory, the restored directory including one or more entries, the subsequent backup including a modified version of the directory;
creating a new directory to replace the restored directory;
for each entry in the modified version of the directory,
if corresponding content is present in the subsequent backup, then using the content from the subsequent backup to create the content in the new directory and linking the content created in the new directory to a corresponding entry in the new directory, and
if corresponding content try is not present in the subsequent backup, then linking the corresponding entry in the new directory to corresponding content in the restored directory by assigning a metadata identifier of the entry in the new directory.

15. A storage system as recited in claim 14, wherein the restoration process further comprises deleting the restored directory.

16. A storage system as recited in claim 14, wherein the set of data is a file system, and the subsequent backup is an image of at least a portion of the file system.

17. A storage system as recited in claim 14, wherein the storage system is a file server and the set of data is a file system.

18. A storage system as recited in claim 14, wherein the metadata identifier is an inode number.

* * * * *